United States Patent
Ding et al.

(10) Patent No.: US 10,706,254 B2
(45) Date of Patent: Jul. 7, 2020

(54) METHOD AND APPARATUS FOR CALIBRATING FINGERPRINT IMAGE, AND TERMINAL

(71) Applicant: SHENZHEN GOODIX TECHNOLOGY CO., LTD., Shenzhen, Guangdong (CN)

(72) Inventors: Caiwu Ding, Guangdong (CN); Guosheng Chen, Guangdong (CN); Hua Zhong, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 92 days.

(21) Appl. No.: 15/790,782

(22) Filed: Oct. 23, 2017

(65) Prior Publication Data
US 2018/0060643 A1 Mar. 1, 2018

Related U.S. Application Data (63) Continuation of application No. PCT/CN2016/076998, filed on Mar. 22, 2016.

(51) Int. Cl.
*G06K 9/00* (2006.01)
*G06F 16/58* (2019.01)
*G06K 9/03* (2006.01)

(52) U.S. Cl.
CPC ......... *G06K 9/00053* (2013.01); *G06F 16/58* (2019.01); *G06K 9/00013* (2013.01);
(Continued)

(58) Field of Classification Search
CPC .......... G06K 9/00053; G06K 9/00087; G06K 9/00067; G06K 9/03; G06K 9/00013; G06F 16/58
See application file for complete search history.

(56) References Cited

U.S. PATENT DOCUMENTS 5,995,642 A * 11/1999 Hsu ...................... G06K 9/0008 382/124
6,068,184 A * 5/2000 Barnett ................ G06Q 20/341 235/379
(Continued)

FOREIGN PATENT DOCUMENTS

| CN | 101605399 A | 12/2009 |
|----|-------------|---------|
| CN | 101853383 A | 10/2010 |

(Continued)

OTHER PUBLICATIONS

Extended Search Report issued in corresponding European patent application No. 16894856.0 dated Mar. 16, 2018.

*Primary Examiner* — Pinalben Patel
(74) *Attorney, Agent, or Firm* — Heslin Rothenberg Farley & Mesiti P.C.

(57) ABSTRACT

A method and an apparatus for calibrating a fingerprint image, and a terminal, are provided. The method for calibrating a fingerprint image includes steps of: obtaining prestored information about a non-fingerprint image; and collecting a fingerprint image, and calibrating the fingerprint image according to the information about the non-fingerprint image. The method can remove a non-fingerprint image part from a collected fingerprint image and improve accuracy of the collected fingerprint image, thereby improving a fingerprint recognition effect.

19 Claims, 6 Drawing Sheets

(52) U.S. Cl.
CPC ..... *G06K 9/00067* (2013.01); *G06K 9/00087* (2013.01); *G06K 9/03* (2013.01)

(56) References Cited

U.S. PATENT DOCUMENTS

| | | | | |
|---|---|---|---|---|
| 6,125,192 | A | * | 9/2000 | Bjorn ...................... G06F 21/32 340/5.83 |
| 7,126,631 | B1 | | 10/2006 | Minemier |
| 7,181,052 | B2 | * | 2/2007 | Fujieda .............. G06K 9/00067 340/5.83 |
| 8,577,091 | B2 | * | 11/2013 | Ivanov ............... G06K 9/00013 382/115 |
| 10,482,311 | B2 | * | 11/2019 | Wu .................... G06K 9/00087 |
| 2001/0040987 | A1 | † | 11/2001 | Bjorn |
| 2002/0191821 | A1 | * | 12/2002 | Bornes ............... G06K 9/00067 382/124 |
| 2003/0044051 | A1 | * | 3/2003 | Fujieda .............. G06K 9/00067 382/124 |
| 2004/0156555 | A1 | | 8/2004 | Irving et al. |
| 2005/0286745 | A1 | * | 12/2005 | Kamata .............. G06K 9/00013 382/115 |
| 2012/0007608 | A1 | | 7/2012 | Hadwen et al. |
| 2015/0022670 | A1 | † | 1/2015 | Gozzini |
| 2015/0071502 | A1 | | 3/2015 | Breznicky |

FOREIGN PATENT DOCUMENTS

| | | | | |
|---|---|---|---|---|
| CN | 102208021 | A | | 10/2011 |
| CN | 105243370 | A | | 1/2016 |
| CN | 109711308 | A * | | 5/2019 |
| CN | 110431564 | A * | 11/2019 | ........... G06K 9/0008 |
| JP | H08316064 | A | | 11/1996 |

\* cited by examiner
† cited by third party

METHOD AND APPARATUS FOR CALIBRATING FINGERPRINT IMAGE, AND TERMINAL

CROSS-REFERENCE TO RELATED APPLICATION

The present application is a continuation of international application No. PCT/CN2016/076998, filed on Mar. 22, 2016, which is hereby incorporated by reference herein, in its entirety.

TECHNICAL FIELD

The present disclosure relates to fingerprint recognition technologies, and in particular, to a method and an apparatus for calibrating a fingerprint image, and a terminal.

BACKGROUND

Fingerprint recognition technologies are widely applied to such related fields as intelligent terminals, electronic security, public security fingerprint collection systems, and have become one of main identity authentication solutions. Currently, a fingerprint sensing technology is basically a standard configuration of an intelligent terminal. Generally, the fingerprint sensing technology of the intelligent terminal is implemented by using a fingerprint module, and the fingerprint module includes a set of fingerprint sensor units. In order to label a location of the fingerprint module, a pattern is silkscreened on a cover corresponding to the fingerprint module in a device, and an intelligent terminal manufacturer also has a demand for silk screening a logo pattern thereof on the fingerprint module.

Currently, it is difficult to form a silkscreen layer as a flat layer, and a part where a logo pattern is silkscreened protrudes from the silkscreen layer and needs to be embedded into a glue layer. Dielectric constants of the silkscreen layer and the glue layer are not completely the same, resulting in a significant difference between a fingerprint sensor unit corresponding to the protrusion and other fingerprint sensor units, and the difference is close to that generated by a fingerprint signal. Consequently, a clear logo image is overlapped on a fingerprint image. In this case, a collected fingerprint image includes not only the fingerprint image but also a logo image. As a result, the collected fingerprint image is inaccurate, and a fingerprint recognition effect is affected.

SUMMARY

The present disclosure aims at resolving one of technical problems in the related technologies at least to some extent.

Accordingly, an objective of the present disclosure is to provide a method for calibrating a fingerprint image. The method can remove a non-fingerprint image part from a collected fingerprint image and improve accuracy of the collected fingerprint image, thereby improving a fingerprint recognition effect.

Another objective of the present disclosure is to provide an apparatus for calibrating a fingerprint image.

Still another objective of the present disclosure is to provide a terminal.

To achieve the above objective, according to a first embodiment of the present disclosure, there is provided a method for calibrating a fingerprint image, including steps of: obtaining prestored information about a non-fingerprint image; and collecting a fingerprint image, and calibrating the fingerprint image according to the information about the non-fingerprint image.

According to the method for calibrating a fingerprint image in the first embodiment of the present disclosure, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

To achieve the above objective, according to a second embodiment of the present disclosure, there is provided an apparatus for calibrating a fingerprint image, including: an obtaining module configured to obtain prestored information about a non-fingerprint image, and a calibration module configured to collect a fingerprint image and calibrate the fingerprint image according to the information about the non-fingerprint image.

According to the apparatus for calibrating a fingerprint image in the second embodiment of the present disclosure, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

To achieve the above objective, according to a third embodiment of the present disclosure, there is provided a terminal, including: a housing, a processor, a memory, a circuit board and a power supply circuit; wherein, the circuit board is disposed in space enclosed by the housing, the processor and the memory are disposed on the circuit board; the power supply circuit is configured to supply power to each circuit or component of the terminal; the memory is configured to store an executable program code; and the processor is configured to execute a program corresponding to the executable program code by reading the executable program code stored in the memory, to perform the following steps of: obtaining prestored information about a non-fingerprint image; and collecting a fingerprint image, and calibrating the fingerprint image according to the information about the non-fingerprint image.

According to the terminal in the third embodiment of the present disclosure, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

To achieve the above objective, according to a fourth embodiment of the present disclosure, there is provided a non-volatile computer storage medium, the non-volatile computer storage medium stores one or more modules, to perform the following steps of: obtaining prestored information about a non-fingerprint image; and collecting a fingerprint image, and calibrating the fingerprint image according to the information about the non-fingerprint image.

According to the non-volatile computer storage medium in the fourth embodiment of the present disclosure, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

Additional aspects and advantages of the disclosure will partly be presented in the following description, partly become apparent in the following description or be appreciated in practicing of the disclosure.

BRIEF DESCRIPTION OF THE DRAWINGS

The above and/or other aspects and advantages of the disclosure will become apparent and better understood from the following detailed description taken in conjunction with the accompanying drawings.

DETAILED DESCRIPTION

The following describes embodiments of the present disclosure in detail, and examples of the embodiments are shown in the accompanying drawings. Same or similar reference numerals always represent same or similar modules or modules having same or similar functions. The embodiments described below with reference to the accompanying drawings are exemplary and are merely intended to explain the present disclosure, rather than limiting the present disclosure. Instead, the embodiments of the present disclosure include all changes, modifications, and equivalents falling within the spirit and the protection scope of the appended claims.

Figure 1:
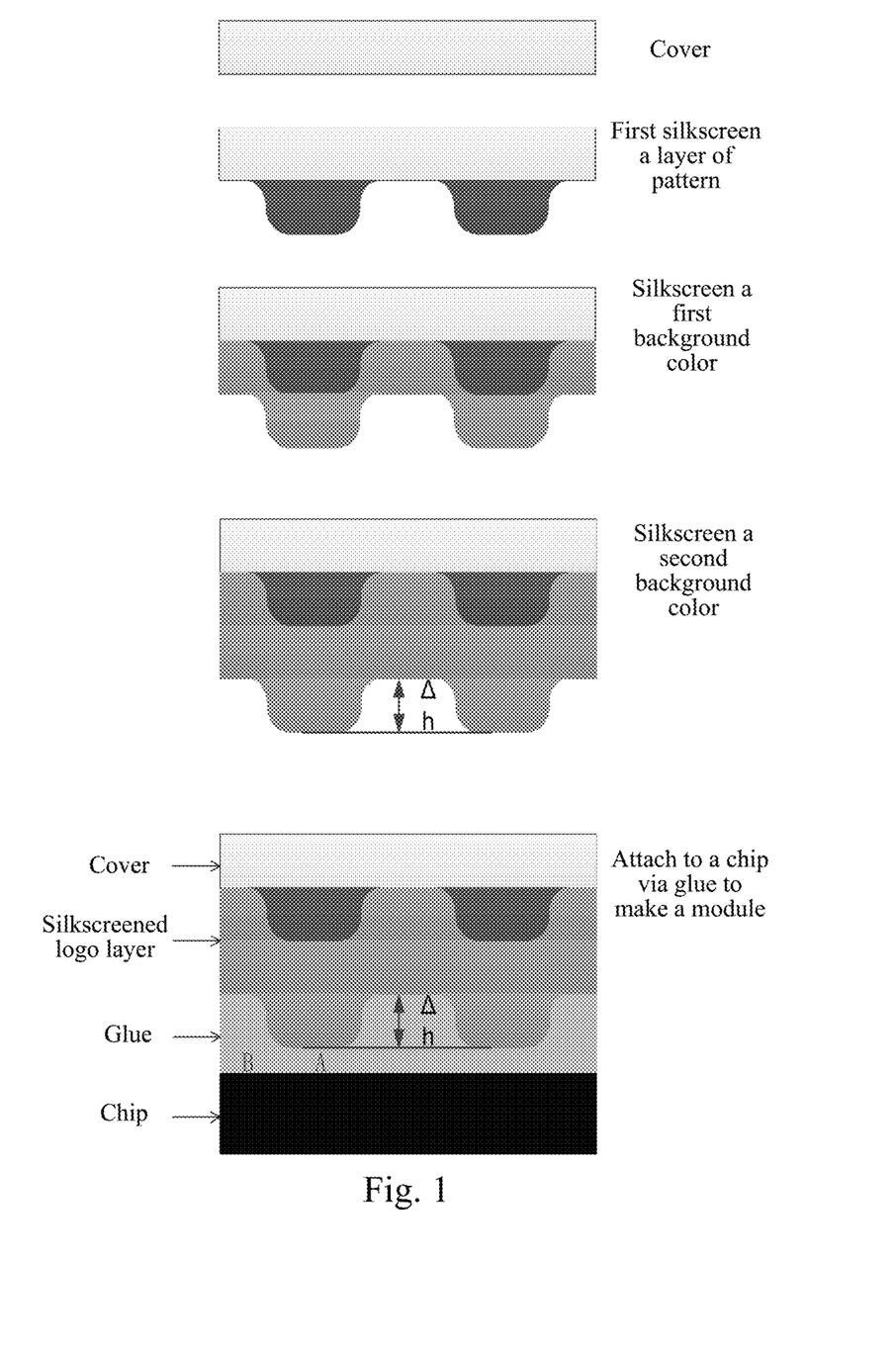
FIG. 1 is a schematic diagram of each layer of a fingerprint module with a silkscreened logo pattern on a cover according to an embodiment of the present disclosure.

FIG. 1 is a schematic diagram of each layer of a fingerprint module with a silkscreened logo pattern on a cover according to an embodiment of the present disclosure. When producing the fingerprint module, the following steps are included. In a first step, a pattern is silkscreened on the cover; in a second step, a first ground colour is silkscreened based on the first step; in a third step, a second ground colour is silkscreened based on the second step; in a fourth step, a module obtained in the third step is attached to a chip via glue, to form the fingerprint module. The chip includes multiple fingerprint sensor units arranged in an array manner.

As shown in FIG. 1, after the logo pattern is silkscreened on the cover, a part of the silkscreened logo layer is embedded in a glue layer. Because dielectric constants of the silkscreened logo layer and the glue layer are different, capacitance values from a surface of the cover to the fingerprint sensor units in the chip are different. As an example, capacitance values of points A and B in FIG. 1 are different. When the fingerprint module collects a fingerprint signal, data collected by the fingerprint sensor units may be considered as a combination of capacitance between a fingerprint by a finger press and the surface of the cover, as well as capacitance between the surface of the cover and the fingerprint sensor units in the chip. The capacitance between the surface of the cover and the fingerprint sensor units in the chip is fixed for a particular module. Because a silkscreened logo signal generated due to a difference brought by the silkscreened layer reaches a magnitude equivalent to that of the fingerprint signal, a collected fingerprint image is overlapped with a clear logo image. Consequently, the fingerprint image collected by the fingerprint sensor unit is inaccurate, and the impact of the silkscreened logo image needs to be eliminated.

To eliminate the impact of the silkscreened logo image, the following embodiments are provided in the present disclosure.

Figure 2:
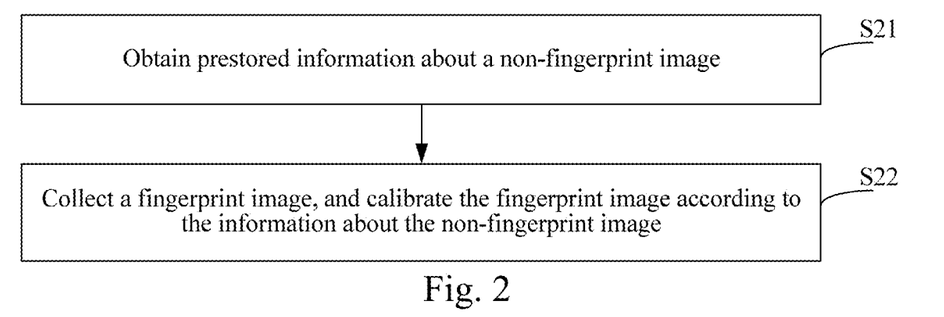
FIG. 2 is a schematic flowchart of a method for calibrating a fingerprint image according to an embodiment of the present disclosure.

FIG. 2 is a schematic flowchart of a method for calibrating a fingerprint image according to an embodiment of the present disclosure.

Referring to FIG. 2, the method includes the following steps.

S21: prestored information about a non-fingerprint image is obtained.

The non-fingerprint image refers to the non-fingerprint image overlapped on a fingerprint image during fingerprint image collection. The non-fingerprint image may be specifically the above logo image. In the present disclosure, the logo image is used as an example. After the logo image is silkscreened on a cover, the information about the logo image does not change. Therefore, the information about the non-fingerprint image may be calculated and stored before delivery of an intelligent terminal.

In some embodiments, the information about the non-fingerprint image may be calculated and stored in a mass production test phase of a fingerprint module (module for short).

Alternatively, in some embodiments, the information about the non-fingerprint image may be calculated and stored in a production test phase of a device.

For examples in specific application scenarios, reference may be made to a subsequent description in detail.

In both the mass production test phase of the fingerprint module and the production test phase of the device, a procedure of obtaining the information about the non-fingerprint image may include a step of:

calculating a gain coefficient of each fingerprint sensor unit in the fingerprint module, and using the gain coefficient as the information about the non-fingerprint image.

Specifically, each fingerprint sensor unit may be abstracted to a linear system with an expression of $Y=Kr*X+B$; X is a detection signal of the fingerprint sensor unit (input to a surface of the module), Y is data output by the fingerprint sensor unit, B is a direct current (DC) component of a fingerprint sensor unit circuit, i.e., response data in the case of no press input, and Kr is the gain coefficient of each fingerprint sensor unit.

Because Kr includes a difference brought by overlapping of the logo image, Kr may serve as information about the logo image.

Figure 3:
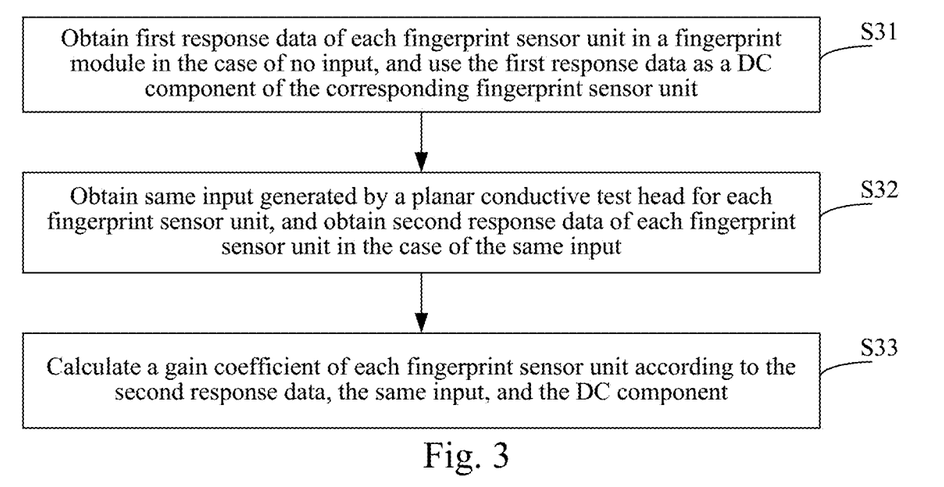
FIG. 3 is a schematic flowchart of calculating Kr according to an embodiment of the present disclosure.

Referring to FIG. 3, a procedure of calculating the gain coefficient Kr includes the following steps.

S31: first response data of each fingerprint sensor unit in the fingerprint module is obtained in the case of no input, and the first response data serves as a DC component of the corresponding fingerprint sensor unit.

According to the above formula Y=Kr*X+B, in the case of no input, i.e., X=0, Y=B. Therefore, when X=0, response data (to be differentiated from subsequent response data, referred to as the first response data herein) is the DC component of the corresponding fingerprint sensor unit.

S32: same input generated by a conductive planar test head for each fingerprint sensor unit is obtained, and second response data of each fingerprint sensor unit is obtained in the case of the same input.

The conductive planar test head is a module that may generate same input for each fingerprint sensor unit in the fingerprint module. In this embodiment, as an example, the conductive planar test head is a conductive planar rubber head. Specifically, the conductive planar rubber head may be a rubber head with one face being a plane. The rubber head contains a conductive material with a resistance less than 800 ohms.

The plane of the conductive planar rubber head may press onto the fingerprint module, and the planar rubber head is kept well grounded, so that the input X for the fingerprint sensor units are the same.

In the case that the input for the fingerprint sensor units are the same, response data of each fingerprint sensor unit may be detected. To be differentiated from the first response data, the response data is referred to as the second response data.

S33: the gain coefficient of each fingerprint sensor unit is calculated according to the second response data, the same input and the DC component.

A calculation formula is:

$$Kr=(data1-B)/C;$$

Kr is the gain coefficient, data1 is the second response data, C is the same input, and B is the DC component.

Therefore, the gain coefficient of each sensor unit may be calculated according to the above operation, and the gain coefficient serves as the information about the logo image for subsequent calibration of the fingerprint image.

S22: a fingerprint image is collected, and the fingerprint image is calibrated according to the information about the non-fingerprint image.

An adopted calibration formula is:

$$CaliData=(data2-B+Kr*B)/Kr+C*avgKr-C;$$

CaliData is data about the fingerprint image after the calibration, data2 is data about the fingerprint image before the calibration, Kr is the gain coefficient, B is the DC component, C is the same input, and avgKr is an average value of the gain coefficients of all the fingerprint sensor units.

A derivation principle of the above calibration formula is as follows:

Step 1: only Kr calibration is performed and the logo image is removed.

According to a known Kr, and Y=KrX+B, X is calculated. Because only Kr calibration is performed, after X is calculated, the DC component B is re-added to obtain the following formula. Because Kr includes impact of an assumed input C, CaliData' is response data when the input C is introduced.

$$CaliData'=(data2-B)/Kr+B.$$

Step 2: impact brought by C is eliminated.

Figure 4:
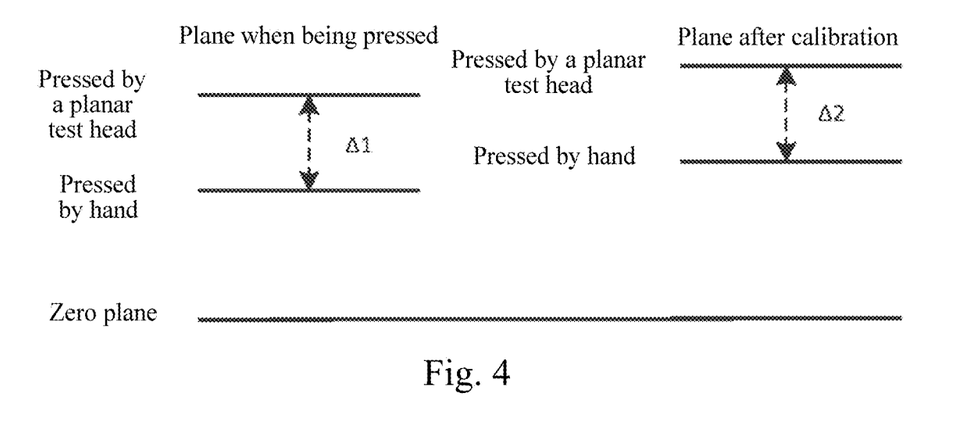
FIG. 4 is a schematic diagram of each plane according to an embodiment of the present disclosure.

Actually, a fingerprint signal may be considered as a sum of a finger press on the plane and a finger's fingerprint signal. The finger's fingerprint signal generates different data on the fingerprint sensor units and is a valid signal. Data generated by the finger press on the plane is completely the same for each fingerprint sensor unit, and is similar to the input value C of the conductive planar rubber head. Both the finger press on the plane and the input value C of the conductive planar rubber head are equivalent input signals on each fingerprint sensor unit, affect only the overall data range rather than the valid fingerprint signal, and have a fixed difference Δ. As shown in FIG. 4, plane calibration may be performed according to a relationship Δ1=Δ2, so as to eliminate the impact brought by C. It is assumed that the plane due to the conductive planar rubber head is higher than the plane due to the hand press in FIG. 4. Calculation is completely the same in the case that the plane due to the conductive planar rubber head is lower than the plane due to the hand press.

Table 1 shows an expression of each plane shown in FIG. 4.

TABLE 1

| | |
|---|---|
| A plane of the press by the conductive planar rubber head pressed plane after calibration | C |
| A plane of the press by hand after calibration | CaliData" = CaliData' − B = (data2 − B)/Kr |
| A plane of the press by the conductive planar rubber head pressed plane before calibration | data = Kr * C + B |
| A plane of the press by hand before calibration | CaliData, to-be-calculated plane |

Δ1=Δ2→A plane of the press by the conductive planar rubber head pressed plane after calibration−A plane of the press by hand after calibration=A plane of the press by the conductive planar rubber head pressed plane before calibration−A plane of the press by hand before calibration. The expressions in Table 1 is substituted to obtain the following calculation formula:

$$C-(data2-B)/Kr=Kr*C+B-CaliData.$$

The following formula is obtained by transposition and simplification:

$$CaliData=(data2-B)/Kr+B+Kr*C-C.$$

Because the overall data range is to be changed, Kr in Kr*C in the above formula is replaced by an average value avgKr of gains Kr of all the fingerprint sensor units in the module. In this case, a final calibration formula is obtained as follows:

$$CaliData=(data2-B+Kr*B)/Kr+C*avgKr-C.$$

In this embodiment, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

Further, Kr may be stored in different phases, and details are separately presented in the following embodiments.

Figure 5:
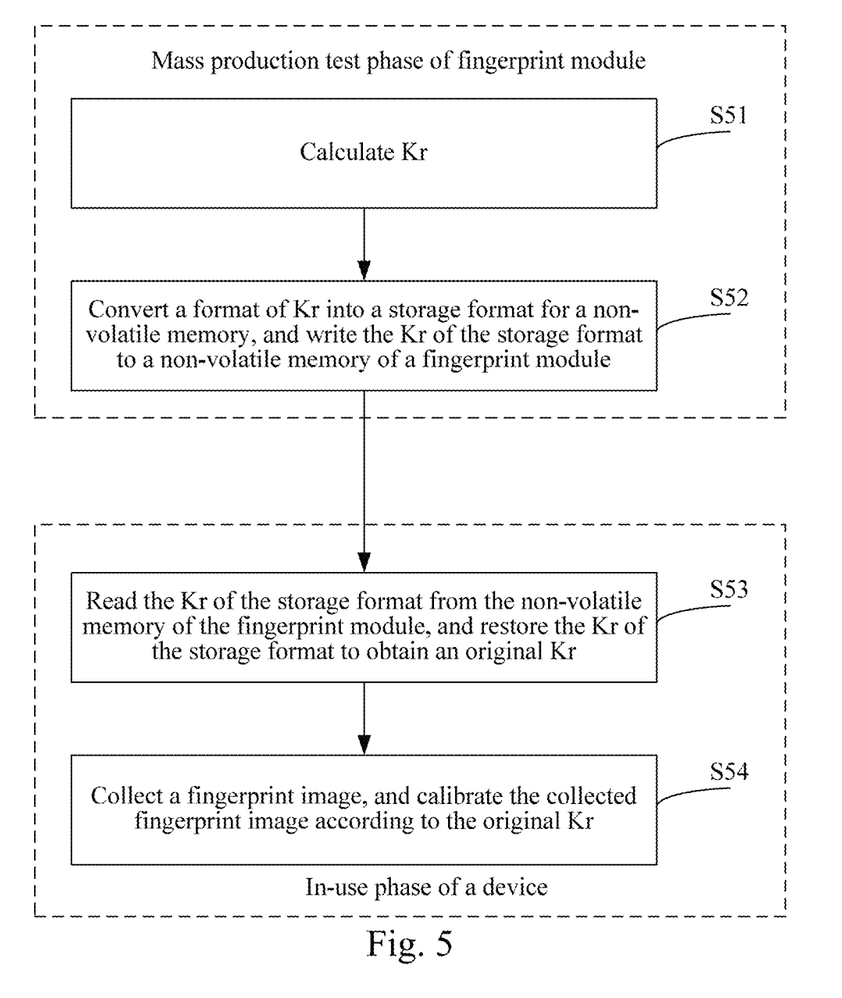
FIG. 5 is a schematic flowchart of a method for calibrating a fingerprint image according to another embodiment of the present disclosure.

FIG. 5 is a schematic flowchart of a method for calibrating a fingerprint image according to another embodiment of the present disclosure. In this embodiment, as an example, Kr is obtained and stored in mass production test phase of fingerprint modules.

Referring to FIG. 5, the method in this embodiment includes the following steps.

S51: Kr is calculated.

A calculation procedure of Kr may be shown in FIG. 3, and the detailed description is not explained herein.

S52: a format of Kr is converted into a storage format for a non-volatile memory, and the Kr is written to the non-volatile memory of a fingerprint module.

According to the above calculation procedure of Kr, Kr may be a decimal. However, the non-volatile memory generally stores data of an integer format. Therefore, it is desired to convert the decimal into an integer for being stored in the non-volatile memory.

Specifically, a mapping relationship between a decimal and an integer may be established, and the format of Kr may be converted into the storage format for the non-volatile memory according to the mapping relationship.

It may be understood that S51 and S52 may be performed in the mass production test phase of fingerprint modules.

Afterwards, the following procedure may be performed in an in-use phase of a device:

S53: the Kr of the storage format is read from the non-volatile memory of the fingerprint module, and the Kr of the storage format is then restored to obtain an original Kr.

As an example, the Kr of the storage format is restored to the original Kr by a reverse process of converting the original Kr into the Kr of the storage format.

S54: a fingerprint image is collected, and the collected fingerprint image is calibrated according to the original Kr.

An adopted calibration formula is:

$$\text{CaliData}=(\text{data2}-B+Kr*B)/Kr+C*\text{avg}Kr-C,$$

CaliData is data about the fingerprint image after the calibration, data2 is data about the fingerprint image before the calibration, Kr is a gain coefficient, B is a DC component, C is a same input, and avgKr is an average value of gain coefficients of all fingerprint sensor units.

The calibration of the fingerprint image may be achieved by the above calibration formula.

In this embodiment, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect. Further, it is applicable for calculation and storage of Kr in the mass production test phase of modules by converting Kr into Kr of the storage format for the non-volatile memory.

Figure 6:
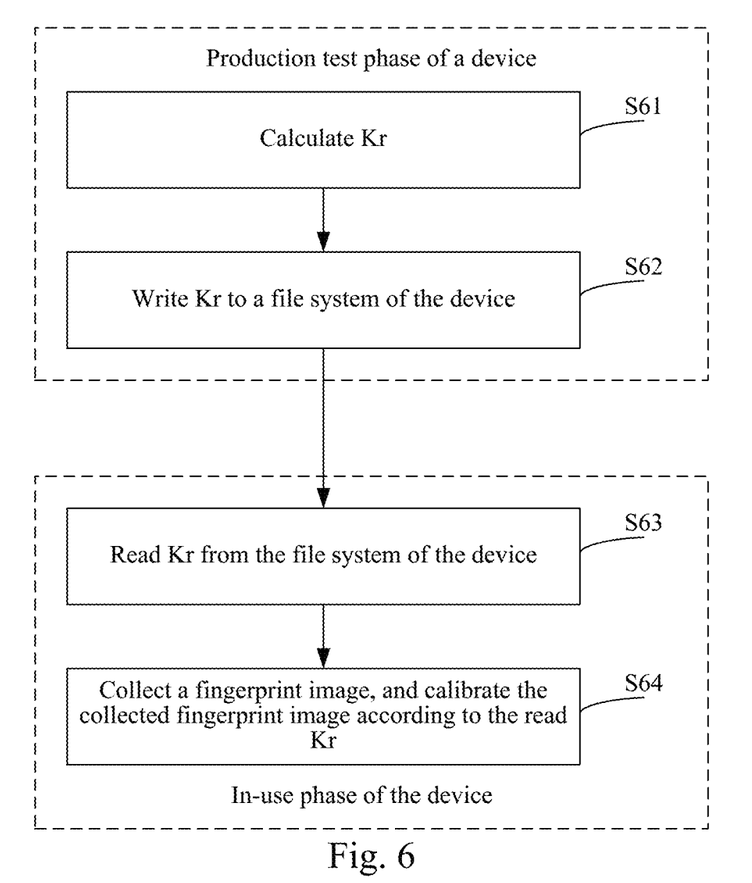
FIG. 6 is a schematic flowchart of a method for calibrating a fingerprint image according to still another embodiment of the present disclosure.

FIG. 6 is a schematic flowchart of a method for calibrating a fingerprint image according to still another embodiment of the present disclosure. In this embodiment, as an example, Kr is obtained and stored in the production test phase of a device.

Referring to FIG. 6, the method in this embodiment includes the following steps.

S61: Kr is calculated.

A calculation procedure of Kr may be shown in FIG. 3, and the detailed description is not explained herein.

S62: Kr is written to a file system of the device.

The file system of the device may store data in a decimal format.

It may be understood that S61 and S62 may be performed in the production test phase of the device.

Afterwards, the following procedure may be performed in an in-use phase of the device:

S63: Kr is read from the file system of the device.

S64: a fingerprint image is collected, and the collected fingerprint image is calibrated according to the read Kr.

An adopted calibration formula is:

$$\text{CaliData}=(\text{data2}-B+Kr*B)/Kr+C*\text{avg}Kr-C,$$

CaliData is data about the fingerprint image after the calibration, data2 is data about the fingerprint image before the calibration, Kr is a gain coefficient, B is a DC component, C is a same input, and avgKr is an average value of gain coefficients of all fingerprint sensor units.

The calibration of the fingerprint image may be achieved by the above calibration formula.

In this embodiment, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect. Further, it is applicable for calculation and storage of Kr in the production test phase of the device by storing Kr into the file system of the device.

Figure 7:
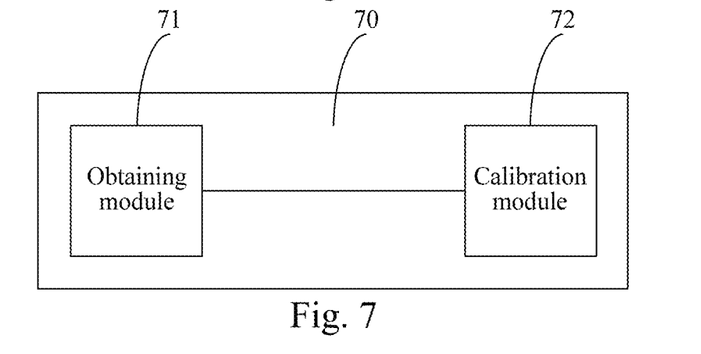
FIG. 7 is a schematic structural diagram of an apparatus for calibrating a fingerprint image according to an embodiment of the present disclosure.

FIG. 7 is a schematic structural diagram of an apparatus for calibrating a fingerprint image according to an embodiment of the present disclosure. Referring to FIG. 7, the apparatus 70 includes an obtaining module 71 and a calibration module 72.

The obtaining module 71 is configured to obtain prestored information about a non-fingerprint image.

The calibration module 72 is configured to collect a fingerprint image and calibrate the fingerprint image according to the information about the non-fingerprint image.

Figure 8:
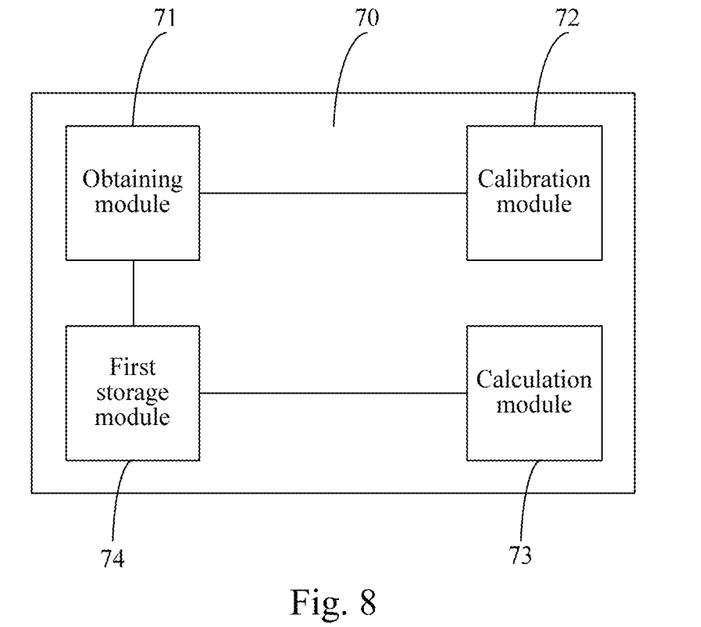
FIG. 8 is a schematic structural diagram of an apparatus for calibrating a fingerprint image according to another embodiment of the present disclosure.

In some embodiments, referring to FIG. 8, the apparatus 70 further includes:

a calculation module 73 configured to calculate the information about the non-fingerprint image; and a first storage module 74 configured to convert a format of the information about the non-fingerprint image into a storage format for a non-volatile memory, and write the information to a non-volatile memory of a fingerprint module.

Correspondingly, the obtaining module 71 is specifically configured to:

read the information about the non-fingerprint image of the storage format from the non-volatile memory of the fingerprint module; and restore the information about the non-fingerprint image of the storage format, to obtain original information of the non-fingerprint image.

Figure 9:
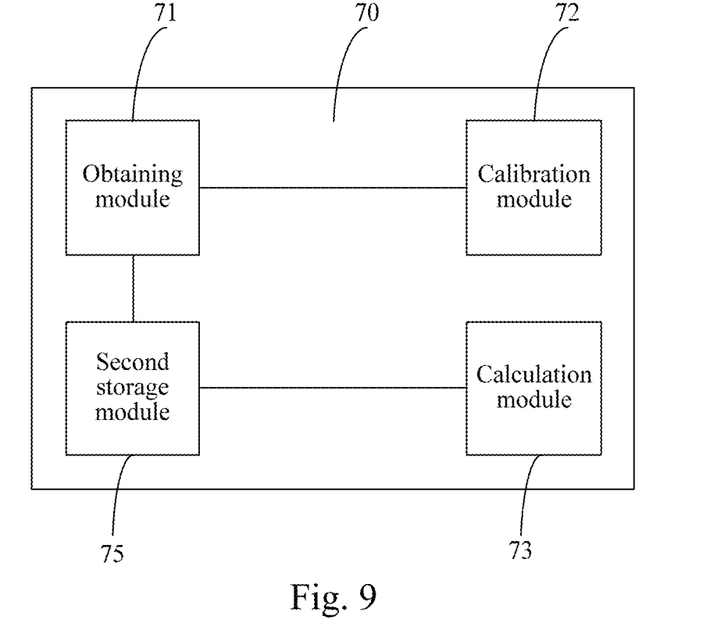
FIG. 9 is a schematic structural diagram of an apparatus for calibrating a fingerprint image according to still another embodiment of the present disclosure.

In some embodiments, referring to FIG. 9, the apparatus 70 further includes:

a calculation module 73 configured to calculate the information about the non-fingerprint image; and a second storage module 75 configured to write the information about the non-fingerprint image to a file system of a device.

Correspondingly, the obtaining module 71 is specifically configured to read the information about the non-fingerprint image from the file system.

In both FIG. 8 and FIG. 9, the calculation module 73 is specifically configured to:

calculate a gain coefficient of each fingerprint sensor unit in the fingerprint module, and use the gain coefficient as the information about the non-fingerprint image.

Optionally, the calculation module 73 is further specifically configured to:

obtain first response data of each fingerprint sensor unit in the fingerprint module in the case of no input, and use the first response data as a DC component of the corresponding fingerprint sensor unit;

obtain same input generated by a conductive planar test head for each fingerprint sensor unit, and obtain second response data of each fingerprint sensor unit in the case of obtaining the same input; and calculate the gain coefficient of each fingerprint sensor unit according to the second response data, the same input and the DC component.

Optionally, according to the second response data, the same input and the DC component, the calculation module 73 calculates the gain coefficient of each fingerprint sensor unit by a calculation formula:

$$Kr=(data1-B)/C,$$

wherein data1 is the second response data, C is the same input, and B is the DC component.

Optionally, the conductive planar test head is a conductive planar rubber head.

Optionally, a calculation formula adopted by the calibration module 72 for calibrating the collected fingerprint image according to the information about the non-fingerprint image is:

$$CaliData=(data2-B+Kr*B)/Kr+C*avgKr-C,$$

CaliData is data about the fingerprint image after the calibration, data2 is data about the fingerprint image before the calibration, Kr is a gain coefficient, B is a DC component, C is same input, and avgKr is an average value of the gain coefficients of all the fingerprint sensor units.

It may be understood that the apparatus in this embodiment corresponds to the above method embodiments, so that the specific content of the modules of the apparatus in this embodiment may refer to the descriptions in the method embodiments, which is not repeatedly described herein.

In this embodiment, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

Figure 10:
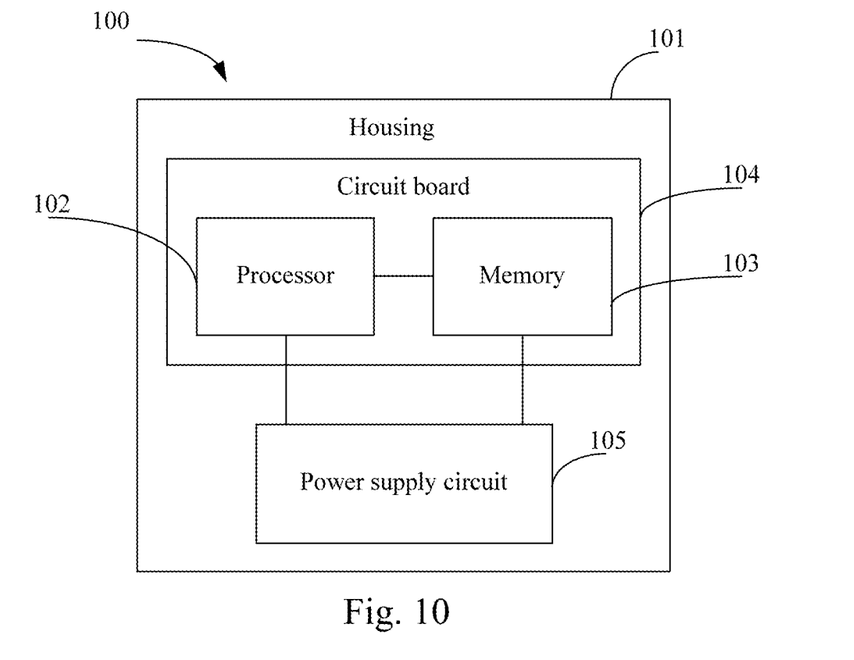
FIG. 10 is a schematic structural diagram of a terminal according to an embodiment of the present disclosure.

FIG. 10 is a schematic structural diagram of a terminal according to an embodiment of the present disclosure. Referring to FIG. 10, the terminal 100 includes a housing 101, a processor 102, a memory 103, a circuit board 104 and a power supply circuit 105, wherein the circuit board 104 is disposed in space enclosed by the housing 101, the processor 102 and the memory 103 are disposed on the circuit board 104; the power supply circuit 105 is configured to supply power to each circuit or component of the terminal; the memory 103 is configured to store an executable program code; and the processor 102 is configured to execute a program corresponding to the executable program code by reading the executable program code stored in the memory, to perform the following steps of:

obtaining prestored information about a non-fingerprint image; and collecting a fingerprint image, and calibrating the fingerprint image according to the information about the non-fingerprint image.

In addition, according to another embodiment of the present disclosure, there is further provided a non-volatile computer storage medium, wherein the non-volatile computer storage medium stores one or more modules, to perform the following steps of:

obtaining prestored information about a non-fingerprint image; and collecting a fingerprint image, and calibrating the fingerprint image according to the information about the non-fingerprint image.

It may be understood that the specific content of the terminal and the non-volatile computer storage medium in the above embodiments may refer to the descriptions in the method embodiments, which is not repeatedly described herein.

In the embodiments, the prestored information about the non-fingerprint image is obtained, and the collected fingerprint image is calibrated according to the information about the non-fingerprint image. This can remove a non-fingerprint image part from a collected fingerprint image and improve accuracy of the collected fingerprint image, thereby improving a fingerprint recognition effect.

It should be noted that, in the descriptions of the present disclosure, terms of "first", "second" and the like are merely for purpose of description and cannot be construed as indicating or implying relative importance. In addition, in the descriptions of the present disclosure, unless otherwise specified, "multiple" means there are at least two objects.

Any process or method described in the flowcharts or in another manner in this specification may be understood as modules, sections, or parts representing code including one or more executable instructions for performing specific logical functions or steps of processes. In addition, the scope of the preferable embodiments of the present disclosure includes other examples. Functions may not be performed in the order that is shown or discussed, including that the related functions are performed basically at the same time or in a reverse order. This should be understood by a skilled person in the art to which the embodiments of the present disclosure belong.

It should be understood that parts of the present disclosure may be implemented by using hardware, software, firmware, or a combination thereof. In the above embodiments, multiple steps or methods may be implemented by using software or firmware that are stored in a memory and are executed by a proper instruction execution system. For example, if the multiple steps or methods are implemented by using hardware, which is the same as that in another embodiment, any one or a combination of the following technologies that are known in the art may be used for implementation: a discrete logic circuit having a logic gate circuit configured to implement a logic function on a data signal, an application-specific integrated circuit having a proper combined logic gate circuit, a programmable gate array (PGA), a field programmable gate array (FPGA), and the like.

A skilled person in the art may understand that all or some of the steps of the methods in the above embodiments may be implemented by using a program instructing relevant hardware. The program may be stored in a computer readable storage medium. When the program is executed, one or a combination of the steps in the method embodiments is performed.

In addition, functional units in the embodiments of the present disclosure may be integrated into one processing module, or each of the units may exist alone physically, or two or more units are integrated into one module. The above integrated module may be implemented in a form of hardware, or may be implemented in a form of a software functional module. When the integrated module is implemented in a form of a software functional module and sold or used as an independent product, the integrated module may be stored in a computer readable storage medium.

The storage medium mentioned above may be a read-only memory, a magnetic disk, an optical disc, or the like.

In the descriptions of this specification, reference terms of "one embodiment", "some embodiments", "an example", "a specific example", or "some examples" are intended to indicate that specific features, structures, materials, or characteristics described with reference to the embodiment or example are included in at least one embodiment or example of the present disclosure. In this specification, exemplary descriptions of the above terms do not necessarily mean a same embodiment or example. In addition, the specific features, structures, materials, or characteristics that are described may be combined in a proper manner in any one or more embodiments or examples.

Although the embodiments of the present disclosure have been shown and described above, it may be understood that the above embodiments are exemplary, and cannot be understood as limitations to the present disclosure. A skilled person in the art may make changes, modifications, replacements, and variations to the above embodiments within the scope of the present disclosure.

What is claimed is:

1. A method for processing a fingerprint image by a terminal, wherein the terminal comprises a cover and a fingerprint chip, and wherein the fingerprint chip comprises one or more fingerprint sensor units arranged in an array manner and the cover is attached to the fingerprint chip via glue, the method comprising:
    calculating a gain coefficient of each fingerprint sensor unit in the fingerprint chip, and using the gain coefficient as the information about a non-fingerprint image; wherein the non-fingerprint image is a logo image silkscreened on the cover of the terminal and the logo image labels a location of the fingerprint chip on the terminal;
    collecting the fingerprint image, wherein the fingerprint image comprises a fingerprint image part and a non-fingerprint image part overlapped on the fingerprint image part; and
    calibrating the fingerprint image according to the information about the non-fingerprint image by removing the non-fingerprint image part from the collected fingerprint image according to the gain coefficient of each fingerprint sensor unit, wherein the gain coefficient comprises a difference brought by overlapping of the logo image;
    wherein the calculating of a gain coefficient of each fingerprint sensor unit in the fingerprint chip comprises:
    obtaining first response data of each fingerprint sensor unit in the fingerprint chip in the case of no input, and using the first response data as a DC component of the corresponding fingerprint sensor unit;
    obtaining same input generated by a conductive planar test head for each fingerprint sensor unit, and obtaining second response data of each fingerprint sensor unit in the case of the same input; and
    calculating the gain coefficient of each fingerprint sensor unit according to the second response data, the same input and the DC component.

2. The method according to claim 1, wherein after calculating a gain coefficient of each fingerprint sensor unit in the fingerprint chip, and using the gain coefficient as the information about a non-fingerprint image, the method further comprises:
    converting a format of the information about the non-fingerprint image into a storage format for a non-volatile memory, and writing the information to the non-volatile memory of the fingerprint chip;
    reading the information about the non-fingerprint image of the storage format from the non-volatile memory of the fingerprint chip; and
    restoring the information about the non-fingerprint image of the storage format.

3. The method according to claim 1, wherein after calculating a gain coefficient of each fingerprint sensor unit in the fingerprint chip, and using the gain coefficient as the information about a non-fingerprint image, the method further comprises:
    writing the information about the non-fingerprint image to a file system of a device;
    reading the information about the non-fingerprint image from the file system.

4. The method according to claim 1, wherein a calculation formula for calculating the gain coefficient of each fingerprint sensor unit according to the second response data, the same input amount and the DC component is:

$$Kr=(data1-B)/C,$$

wherein data1 is the second response data, C is the same input, and B is the DC component.

5. The method according to claim 4, wherein a calculation formula for calibrating the fingerprint image according to the information about the non-fingerprint image is:

$$CaliData=(data2-B+Kr*B)/Kr+C*avgKr-C,$$

wherein CaliData is data about the fingerprint image after the calibration, data2 is data about the fingerprint image before the calibration, Kr is the gain coefficient, B is the DC component, C is the same input, and avgKr is an average value of the gain coefficients of all the fingerprint sensor units.

6. The method according to claim 1, wherein the conductive planar test head is a conductive planar rubber head.

7. An apparatus for processing a fingerprint image, comprising: one or more fingerprint sensor units arranged in an array manner; and
    a non-transitory storage medium having machine-readable instructions which, when executed by one or more processors, are configured to:
    calculate a gain coefficient of each fingerprint sensor unit in the fingerprint chip, and use the gain coefficient as the information about a non-fingerprint image; wherein the non-fingerprint image is a logo image silkscreened on a cover of a terminal and the logo image labels a location of the fingerprint chip on the terminal;
    collect the fingerprint image, wherein the fingerprint image comprises a fingerprint image part and a non-fingerprint image part overlapped on the fingerprint image part; and
    calibrate the fingerprint image according to the information about the non-fingerprint image by removing the non-fingerprint image part from the collected fingerprint image according to the gain coefficient of each fingerprint sensor unit, wherein the gain coefficient comprises a difference brought by overlapping of the logo image;

wherein the machine-readable instructions are further configured to:

obtain first response data of each fingerprint sensor unit of the apparatus in the case of no input, and use the first response data as a DC component of the corresponding fingerprint sensor unit;

obtain same input generated by a conductive planar test head for each fingerprint sensor unit, and obtain second response data of each fingerprint sensor unit in the case of the same input; and calculate the gain coefficient of each fingerprint sensor unit according to the second response data, the same input, and the DC component.

8. The apparatus according to claim 7, wherein the machine-readable instructions are further configured to:

convert a format of the information about the non-fingerprint image into a storage format for the non-transitory storage medium, and write the information to the non-transitory storage medium of the apparatus;

read the information about the non-fingerprint image of the storage format from the non-transitory storage medium; and restore the information about the non-fingerprint image of the storage format.

9. The apparatus according to claim 7, wherein the machine-readable instructions are further configured to:

write the information about the non-fingerprint image to a file system of a device;

read the information about the non-fingerprint image from the file system.

10. The apparatus according to claim 9, wherein a calculation formula to calculate the gain coefficient of each fingerprint sensor unit according to the second response data, the same input and the DC component is:

Kr=(data1−B)/C, wherein, data1 is the second response data, C is the same input, and B is the DC component.

11. The apparatus according to claim 10, wherein a calculation formula to calibrate the fingerprint image according to the information about the non-fingerprint image is:

CaliData=(data2−$B$+Kr*$B$)/Kr+$C$*avgKr−$C$, wherein CaliData is data about the fingerprint image after the calibration, data2 is data about the fingerprint image before the calibration, Kr is the gain coefficient, B is the DC component, C is the same input, and avgKr is an average value of the gain coefficients of all the fingerprint sensor units.

12. The apparatus according to claim 9, wherein the conductive planar test head is a conductive planar rubber head.

13. The apparatus according to claim 7, wherein a calculation formula to calculate the gain coefficient of each fingerprint sensor unit according to the second response data, the same input and the DC component is:

Kr=(data1−B)/C, wherein, data1 is the second response data, C is the same input, and B is the DC component.

14. The apparatus according to claim 13, wherein a calculation formula to calibrate the fingerprint image according to the information about the non-fingerprint image is:

CaliData=(data2−$B$+Kr*$B$)/Kr+$C$*avgKr−$C$, wherein CaliData is data about the fingerprint image after the calibration, data2 is data about the fingerprint image before the calibration, Kr is the gain coefficient, B is the DC component, C is the same input, and avgKr is an average value of the gain coefficients of all the fingerprint sensor units.

15. The apparatus according to claim 7, wherein the conductive planar test head is a conductive planar rubber head.

16. A terminal, comprising: a cover, a fingerprint chip comprising one or more fingerprint sensor units arranged in an array manner, a housing, a processor, a memory having machine-readable instructions, a circuit board and a power supply circuit;

wherein the cover is attached to the fingerprint chip via glue;

wherein the circuit board is disposed in space enclosed by the housing, and the fingerprint chip, the processor and the memory are disposed on the circuit board;

wherein the power supply circuit is configured to supply power to each circuit or component of the terminal; and wherein the processor is configured to execute machine-readable instructions in the memory, to:

calculate a gain coefficient of each fingerprint sensor unit in the fingerprint chip, and use the gain coefficient as the information about a non-fingerprint image; wherein the non-fingerprint image is a logo image silkscreened on the cover of the terminal and the logo image labels a location of the fingerprint chip on the terminal;

collect a fingerprint image, wherein the fingerprint image comprises a fingerprint image part and a non-fingerprint image part overlapped on the fingerprint image part; and calibrate the fingerprint image according to the information about the non-fingerprint image by removing the non-fingerprint image part from the collected fingerprint image according to the gain coefficient of each fingerprint sensor unit, wherein the gain coefficient comprises a difference brought by overlapping of the logo image;

wherein the processor is further configured to execute machine-readable instructions in the memory, to:

obtain first response data of each fingerprint sensor unit of the apparatus in the case of no input, and use the first response data as a DC component of the corresponding fingerprint sensor unit;

obtain same input generated by a conductive planar test head for each fingerprint sensor unit, and obtain second response data of each fingerprint sensor unit in the case of the same input; and calculate the gain coefficient of each fingerprint sensor unit according to the second response data, the same input, and the DC component.

17. The method according to claim 6, wherein a calculation formula for calculating the gain coefficient of each fingerprint sensor unit according to the second response data, the same input amount and the DC component is:

Kr=(data1−$B$)/$C$, wherein data1 is the second response data, C is the same input, and B is the DC component.

18. The method according to claim 17, wherein a calculation formula for calibrating the fingerprint image according to the information about the non-fingerprint image is:

CaliData=(data2−$B$+Kr*$B$)/Kr+$C$*avgKr−$C$, wherein CaliData is data about the fingerprint image after the calibration, data2 is data about the fingerprint image before the calibration, Kr is the gain coefficient, B is the DC component, C is the same input, and avgKr is an average value of the gain coefficients of all the fingerprint sensor units.

19. The method according to claim 16, wherein the conductive planar test head is a conductive planar rubber head.

* * * * *

UNITED STATES PATENT AND TRADEMARK OFFICE
CERTIFICATE OF CORRECTION

PATENT NO. : 10,706,254 B2
APPLICATION NO. : 15/790782
DATED : July 7, 2020
INVENTOR(S) : Ding et al.

Page 1 of 1

It is certified that error appears in the above-identified patent and that said Letters Patent is hereby corrected as shown below:

In the Claims

Column 14, Line 55: Claim 17, Delete "claim 6" and insert -- claim 16 --

Signed and Sealed this
First Day of September, 2020

Andrei Iancu
*Director of the United States Patent and Trademark Office*